(12) United States Patent
Revenu et al.

(10) Patent No.: US 11,709,521 B1
(45) Date of Patent: Jul. 25, 2023

(54) SYNCHRONOUS CLOCK DOMAIN CROSSING SKEW OPTIMIZATION AND MULTI-CLOCK BUFFER (MBUFG)

(71) Applicant: Xilinx, Inc., San Jose, CA (US)

(72) Inventors: Frederic Revenu, San Carlos, CA (US); Frank Mueller, Erie, CO (US); Thomas O. Satter, Boulder, CO (US); Mehrdad Eslami Dehkordi, Los Gatos, CA (US); Garik Mkrtchyan, Fremont, CA (US); Satish B. Sivaswamy, Fremont, CA (US); Nicholas A. Mezei, Thornton, CO (US); Chun Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 171 days.

(21) Appl. No.: 16/913,716

(22) Filed: Jun. 26, 2020

(51) Int. Cl.
*G06F 1/06* (2006.01)

(52) U.S. Cl.
CPC .................................. *G06F 1/06* (2013.01)

(58) Field of Classification Search
CPC ......... G06F 1/06; G06F 2207/388; G06F 1/10; G06F 1/12
See application file for complete search history.

(56) References Cited

U.S. PATENT DOCUMENTS

| | | | |
|---|---|---|---|
| 6,536,024 B1* | 3/2003 | Hathaway | G06F 1/10 327/295 |
| 6,952,813 B1 | 10/2005 | Rahut | |
| 7,312,631 B1 | 12/2007 | Bauer et al. | |
| 7,430,728 B1 | 9/2008 | Rahut | |
| 7,548,089 B1 | 6/2009 | Bauer et al. | |
| 7,904,860 B1 | 3/2011 | Rahut | |
| 8,001,504 B1 | 8/2011 | Campbell | |
| 8,205,180 B1 | 6/2012 | Anderson et al. | |
| 8,205,182 B1* | 6/2012 | Zlatanovici et al. | G06F 30/398 716/113 |
| 10,483,996 B1 | 11/2019 | Erdmann et al. | |
| 2001/0013100 A1* | 8/2001 | Doblar et al. | G11C 7/22 713/400 |
| 2002/0114224 A1* | 8/2002 | Sasaki et al. | G06F 30/30 368/113 |

* cited by examiner

*Primary Examiner* — Jaweed A Abbaszadeh
*Assistant Examiner* — Hyun Soo Kim
(74) *Attorney, Agent, or Firm* — Patterson + Sheridan, LLP

(57) ABSTRACT

Synthetizing a hardware description language code into a netlist comprising loads and a multi-clock buffer (MBUF). The MBUF receives a global clocking signal and generates a first and a second related clocking signals. The loads are grouped into a first and a second groups receiving the first and the second clocking signals respectively. A first/second clock modifying leaf are placed between a common node and the first/group groups respectively, wherein the common node is positioned closer in proximity to the first/second groups in comparison to a clock source generating the global clocking signal. The first/second clock modifying leaves receive a least divided clocking signal from the MBUF and generate the first/second clocking signals respectively. The least divided clocking signal is routed from the MBUF to the first/second clock modifying leaves. The first/second clocking signals are routed from the first/second clock modifying leaves to the first/second group respectively.

17 Claims, 14 Drawing Sheets

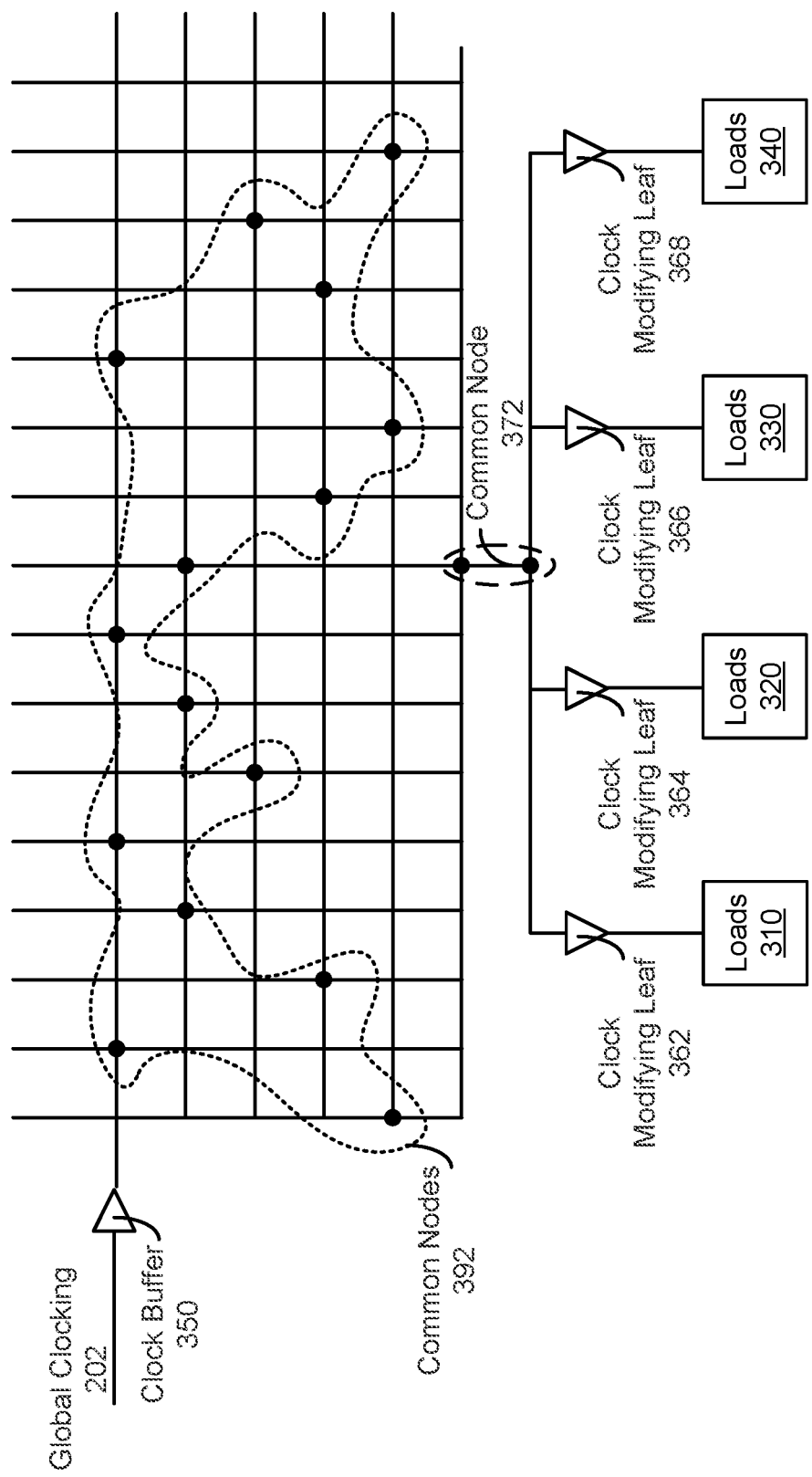

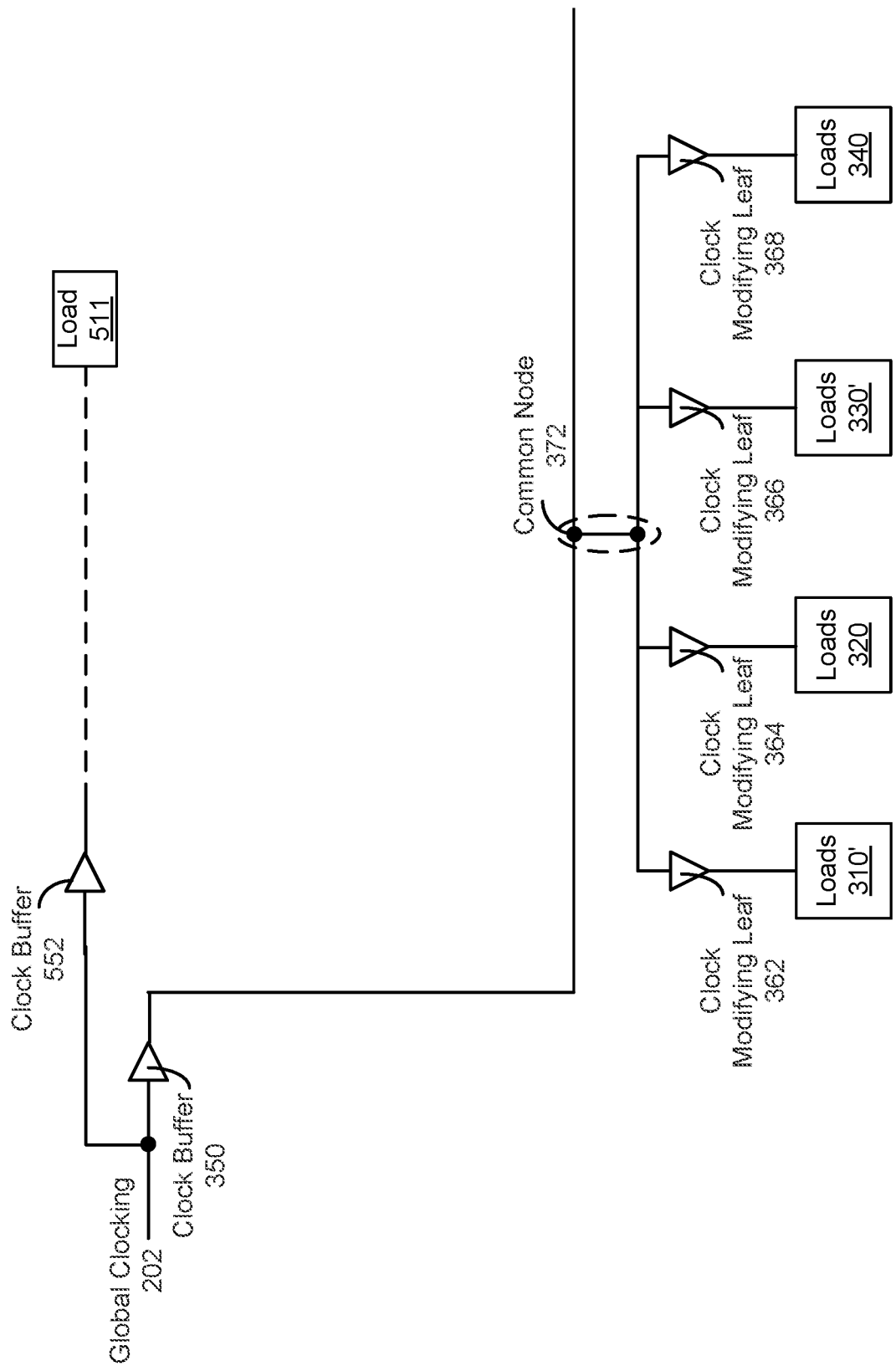

US 11,709,521 B1

SYNCHRONOUS CLOCK DOMAIN CROSSING SKEW OPTIMIZATION AND MULTI-CLOCK BUFFER (MBUFG)

RELATED APPLICATIONS

The instant application is related to the U.S. Application No. 16/533,324, filed on Aug. 6, 2019, which is incorporated herein by reference in its entirety.

TECHNICAL FIELD

Examples of the present disclosure generally relate to synthesis of Hardware Description Language (HDL) code and placement of leaf clock divider to generate low skew between related clocks.

BACKGROUND

Many applications use two or more clocking signals from a common clock source. Typically, these two or more clocking signals are distributed throughout the chip to clock various loads. Use of the two or more clocking signals is even more challenging in applications that are programmable because the requirements for the two or more clocking signals are not known in advance but are rather programmed at a later time.

In general, the common clock source is far away from the loads that they are distributed to. Unfortunately, using the two or more clocking signals requires much more power than using just one clocking signal. Furthermore, routing the two or more clocking signals throughout the chip is subject to process, voltage, and temperature (PVT) variations, thereby resulting in clock pessimism including clock skew between the two or more clocking signals. Moreover, clock jitter is also high between the two or more clocking signals.

SUMMARY

Examples described herein relate to synthesis of a Hardware Description Language (HDL) code to generate a netlist. The components, e.g., loads (e.g., flip-flops, configurable logic blocks, Digital Signal Processing (DSP) blocks, block RAM, lookup tables (LUT), etc.), clock buffers, etc., are placed and routed, such that instead of generating a related global clock, e.g., global clock divided by 2, 4, 8, etc., and fanning out the related clocks throughout the chip, the least divided clocking signal that is related to the global clock is fanned out and the needed related clocking signal is locally generated, thereby saving power and reducing clock pessimism such as clock skew.

It is appreciated that a multi-clock buffer may be used to generate a plurality of related clocking signals, e.g., divided by 2, 4, 8, etc., from the received the global clocking signal. Only one of the related clocking signals of the multi-clock buffer (e.g., least divided clocking signal) is output and fanned out to a plurality of loads. A first clock modifying leaf is placed close to the first set of loads to generate a first related clocking signal from the received related clocking signal from the multi-clock buffer. It is appreciated that a second clock modifying leaf is placed close to the second set of loads to generate the second related clocking signal from the received related clocking signal from the multi-clock buffer. It is appreciated that the first modifying leaf and the second modifying leaf are placed in close proximity to the first and second set of loads and are each connected to a common node that receives the related clocking signal from the multi-clock buffer. As such, less power is required to fanout the clocking signal throughout the chip because only one clocking signal (e.g., related clocking signal output from the multi-clock buffer) is distributed throughout the chip. Moreover, the skew between the clocking signal and the related clocking signal is reduced because the related clocking signal is generated at the leaf node, thus subject to the same PVT variations as the one clocking signal at the leaf node. Also, since only one clocking signal is fanned out to the entire chip and the related clocking signal is generated at the leaf node, the jitter between the clocking signal and the related clocking signal being generated at the leaf node is substantially the same as one another.

In a non-limiting example, a method includes synthetizing an HDL into a netlist comprising a first plurality of loads, a second plurality loads, and a multi-clock buffer. The method further includes placing and routing the first plurality of loads, the second plurality of loads, and the multi-clock buffer. The multi-clock buffer is configured to receive a global clocking signal and to generate a plurality of multi-clock buffer output signals related to the global clocking signal. The first plurality of loads is configured to receive a first clocking signal. The second plurality of loads is configured to receive a second clocking signal. In some embodiments, the placing and routing comprises identifying a common node to the first plurality of loads and the second plurality of loads. The common node is identified to reduce a clocking pessimism analysis during timing analysis to within a predetermined threshold value. The common node is positioned closer in proximity to the first plurality of loads and the second plurality of loads in comparison to a clock source generating the global clocking signal. It is appreciated that a first clock modifying leaf configured to generate the first clocking signal is placed between the common node and the first plurality of loads. A second clock modifying leaf configured to generate the second clocking signal is placed between the common and the second plurality of loads. In some embodiments, the global clocking signal is routed to the multi-clock buffer and one multi-clock buffer output signal is routed from the plurality of multi-clock buffer output signals as a shared multi-clock buffer clocking signal to the first and second clock modifying leaves. The first clocking signal is routed from the first clock modifying leaf to the first plurality of loads and the second clocking signal is routed from the second clock modifying leaf to the second plurality of loads.

In some embodiments, the method further includes fusing the first plurality of loads and the second plurality of loads into a single physical net driven by the multi-clock buffer and wherein a third plurality of loads driven by a buffer different from the multi-clock buffer is in a different physical net. It is appreciated that in some nonlimiting examples the different physical net for the third plurality of loads is driven by different clock modifying leaves than the single physical net. According to one nonlimiting example, paths from the different clock modifying leaves to the third plurality of loads are nonoverlapping with paths from the single physical net.

In some embodiments, the identifying includes identifying a plurality of common nodes. The used common node of the plurality of common nodes is a closest common node to the first plurality of loads and the second plurality of loads that can share the one multi-clock buffer output signal before locally generating the first and the second clocking signals using the first and the second clock modifying leaves respectively.

According to one nonlimiting example, the method further includes marking an output of the multi-clock buffer corresponding to the one multi-clock buffer output signal as a parent net for the first plurality of loads and the second plurality of loads. It is appreciated that the one multi-clock buffer output signal has a least divided clocking signal. In one embodiment, the method further includes determining and setting a modifying factor associated with the first clock modifying leaf and the second clock modifying leaf based on the least divided clocking signal. In one nonlimiting example, the one multi-clock buffer output signal is a same as the first clocking signal. In one nonlimiting example, the plurality of multi-clock buffer output signals is an integer division of the global clocking signal.

In some embodiments, the method may further include synchronizing the first and the second clock modifying leaves. The synchronizing may include stopping transmission of the one multi-clock buffer output signal to the first and the second clock modifying leaves. The synchronizing may further include releasing the stopping after the multi-clock buffer output signal transmission has propagated to the first and the second clock modifying leaves. The synchronizing also includes transmitting the one multi-clock buffer output signal to the first and the second clock modifying leaves.

In one embodiment, the method further includes assigning a set of loads to be driven by the first clocking signal to the first plurality of loads.

In one nonlimiting example, the method includes identifying a plurality of clock buffers associated with a third plurality of loads, wherein each clock buffer of the plurality of clock buffers is configured to receive the global clocking signal and to generate a third clocking signal that is related to the global clocking signal and wherein the third clocking signal is an input to each load of the third plurality of loads, and wherein the third clocking signal has a same waveform as an output signal of the plurality of multi-clock buffer output signals. The method further includes removing the plurality of clock buffers. The method may also include placing and routing a third clock modifying leaf configured to receive the shared multi-clock buffer clocking signal from the multi-clock buffer and to generate the third clocking signal. The third clock modifying leaf is placed between the common node and the third plurality of loads and routes the third clocking signal to the third plurality of loads.

In one nonlimiting example, the method further includes identifying a plurality of clock buffers associated with a third plurality of loads. Each clock buffer of the plurality of clock buffers is configured to receive the global clocking signal and to generate one output signal of another plurality of multi-clock buffer output signals related to the global clocking signal. The method further includes removing the plurality of clock buffers. According to some embodiments, the method further includes placing another multi-clock buffer configured to receive the global clocking signal and generate the another plurality of multi-clock buffer output signals. According to one nonlimiting example, the method further includes identifying another common node to the third plurality of loads, wherein the another common node is identified to reduce a clocking pessimism analysis during timing analysis to within a predetermined threshold value. It is appreciated that the another common node is positioned closer in proximity to the third plurality of loads in comparison to the clock source generating the global clocking signal. A plurality of clock modifying leaves configured to generate clocking signals corresponding to the another plurality of clock buffer output signals is placed between the another common node and the third plurality of loads. The method further includes routing the global clocking signal to the another multi-clock buffer and routing a least divided clocking signal from the another plurality of multi-clock buffer output signals as another shared multi-clock buffer clocking signal from the another multi-clock buffer to the third plurality of clock modifying leaves and further routing the respective clocking signal from respective leaf of the third plurality of leaves to respective load of the third plurality of loads.

It is appreciated that a load of the first plurality of loads may be at least one of a flip-flop or a configurable logic block.

In one nonlimiting example, a method includes synthetizing an HDL code into a netlist comprising a plurality of loads and a multi-clock buffer. The multi-clock buffer is configured to receive a global clocking signal and to generate a plurality of related clocking signals including a first clocking signal and a second clocking signal. The method further includes grouping the plurality of loads into at least a first group of loads and a second group of loads. The first group of loads is configured to receive the first clocking signal and wherein the second group of loads is configured to receive the second clocking signal. The method additionally includes placing a first clock modifying leaf between a node and the first group of loads. The node is a common to the first and the second group of loads and is positioned closer in proximity to the first and the second group of loads in comparison to a clock source generating the global clocking signal. The first clock modifying leaf is configured to receive a least divided clocking signal from the multi-clock buffer. The method further includes placing a second clock modifying leaf between the node and the second group of loads. The second clock modifying leaf is configured to receive the least divided clocking signal from the multi-clock buffer. The method also includes routing the least divided clocking signal from the multi-clock buffer, that receives the global clocking signal and generates the plurality of related clocking signals, to the first and the second clock modifying leaves and further routing the first clocking signal from the first clock modifying leaf to the first group of loads and routing the second clocking signal from the second clock modifying leaf to the second group of loads.

In one nonlimiting embodiments, the method further includes fusing the first group of loads and the second group of loads into a single physical net driven by the multi-clock buffer and wherein a third group of loads driven by a buffer different from the multi-clock buffer is in a different physical net. It is appreciated that the different physical net for the third group of loads is driven by different clock modifying leaves than the single physical net. According to one embodiment, the method further includes marking an output of the multi-clock buffer corresponding to the least divided clocking signal as a parent net for the first group of loads and the second group of nodes. In one nonlimiting example, the method further includes determining and setting a modifying factor associated with the first clock modifying leaf and the second clock modifying leaf based on the least divided clocking signal.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 shows a block diagram depicting a physical view of a multi-clock buffer and a set of common nodes, according to some examples.

FIGS. 5A-5B show optimization in replacing multiple clock buffers with a lower number of multi-clock buffers instead to reduce clock pessimism, according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
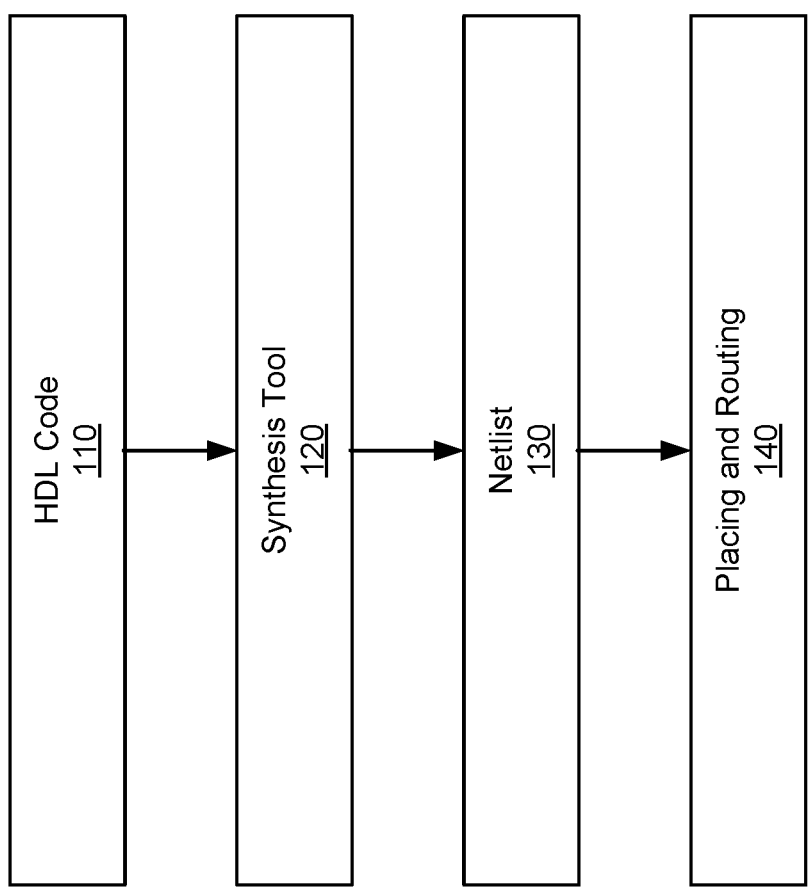
FIG. 1 shows a block diagram depicting a synthesis of an HDL code and placing and routing the generated netlist, according to some examples.

According to some aspects of the examples described herein, a Hardware Description Language (HDL) code is synthesized. The synthesis generates a netlist including components, e.g., multi-clock buffer, loads (e.g., flip-flips, configurable logic blocks, Digital Signal Processing (DSP) unit, block RAM, lookup table (LUT), etc.), clock buffers, etc., which are subsequently placed and routed. It is appreciated that often times multiple related clocking signals are desired, e.g., global clocking signal divided by 2, 4, 8, etc., to be routed to their respective loads. However, generating the related clocking signals far away from the loads and to fan them out separately results in large clock path pessimism as well as large clock skew because different paths would be subject to different PVT variations.

Accordingly, there is a need to improve clock path pessimism and the clock skew. Instead of generating multiple related global clocks, e.g., global clock divided by 2, 4, 8, etc., closer to the source generating the global clock and fanning them out throughout the chip, one clocking signal, e.g., the least divided clocking signal for multiple loads that is related to the global clock, is fanned out. A clock modifying leaf can be placed in close proximity to its load(s). Each clock modifying leaf receives the fanned out related global clocking signal and generates the desired related clocking signal locally. Since different loads that need different related clocking signals can share the same clocking path (e.g., by clocking the least divided clocking signal) and each load can use its respective clock modifying leaf to generate its desired related clocking signal, power and resources are saved by eliminating or at least minimizing the need to fanout multiple related clocking signals that are generated close to the source generating the global clock and to fan them out throughout the chip. Moreover, use of the same clocking path improves clock pessimism and clock skew because the clocking signal received by each clock modifying leaf is subject to the same PVT variation.

It is appreciated that the embodiments fanout fewer clocking signals (e.g., related to the global clocking signal) throughout the chip. The embodiments leverage the use of a multi-clock buffer that is configured to receive the global clocking signal and to generate a plurality of related clocking signals (e.g., global clocking signal divided by 2, 4, 8, etc. or global clocking signal multiplied by 2). It is appreciated that in one nonlimiting example, the least divided clocking signal for a number of load groups is selected to be fanned out from the output of the multi-clock buffer instead of fanning out every related clocking signal of the plurality of related clocking signals, thereby reducing the number of clock routing. The output of the multi-clock buffer transmits the selected output signal to one or more clock modifying leaf nodes. Each clock modifying leaf node may be configured to receive the selected output signal from the multi-clock buffer and to generate the desired related clocking signal for its respective load(s). In other words, at the clock modifying leaf nodes, usually much further away from the clock source, a related clocking signal is locally generated where needed.

As an example, if a first group of loads is to receive a first related clocking signal (e.g., global clocking signal divided by 2) and a second group of loads to receive a second related clocking signal (e.g., global clocking signal divided by 4), then the multi-clock buffer transmits a related clocking signal (e.g., least divided clocking signal such as global clocking signal divided by 2) to a first clock modifying leaf associated with the first group of loads and to a second clock modifying leaf associated with the second group of loads. The first and the second clock modifying leaves are connected to a common node that receive the related clocking signal from the multi-clock buffer and are in close proximity to their respective loads, hence the first and second group of loads. The first clock modifying leaf divides the received related clocking signal by 1 whereas the second clock modifying leave divides the received related clocking signal by 2, so that the first and the second group of loads can receive their respective first and second related clocking signals, as locally generated by their respective clock modifying leaves. As illustrated, one clocking signal is fanned out instead of two in the example above. Accordingly, less power is used since a single clocking signal is transmitted. Moreover, the clock path pessimism and clock skew are improved because the same path that is subject to the same PVT variations is used.

In other words, a related clocking signal may be generated locally at a leaf node from a global clocking signal, thereby using less power because only one global clocking signal/related signal is fanned out to the entire chip rather than multiple clocking signals. Fanning out one signal and generating related clocking signals at leaf nodes is further advantageous by reducing resource utilization such as metal utilization, thereby reducing cost. Generating related clocking signals at leaf nodes is further advantageous since the skew between the clocking signal and the related clocking signal is reduced because the generated related clock signal is subject to the same PVT variations as the one global clocking signal at the leaf node. Also, since only one clocking signal is fanned out to the entire chip and the related clocking signal is generated at the leaf node, the jitter between the clocking signal and the related clocking signals being generated at the leaf node are substantially the same as one another.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

FIG. 1 shows a block diagram depicting a synthesis of an HDL code and placing and routing the generated netlist, according to some examples. An HDL code 110 may be sent to a synthesis tool 120. It is appreciated that the HDL code may describe the structure and behavior of electronic circuits, e.g., digital circuits. Synthesizing the HDL code generates a netlist 130. The netlist may include various components such as multi-clock buffer, loads (e.g., flip-flips, configurable logic blocks, Digital Signal Processing (DSP) unit, block RAM, lookup table (LUT), etc.), clock buffers, etc. The netlist may then be placed and routed 140. Placing and routing the netlist generates a set of masks that are used to create an application specific integrated circuit (ASIC). It is, however, appreciated that in programmable devices such as FPGA no mask is generated. It is appreciated that after synthesis, a special component hereinafter referred to as multi-clock buffer is used to reduce power usage, reduce metal usage, improve clock pessimism and clock skew in systems with cross domain clock paths also known as systems using multiple clocking signals. An example of a system using multiple clocking signals would be two sequentially adjacent flip-flops that are clocked by two clock sources from the same global clocking signal. It is appreciated that clock pessimism and clock skew get worse in absence of using multi-clock buffer and as the flip-flops are placed further away from the two clock sources that receive the global clocking signal because each clock path would be subject to its own PVT variation. It is appreciated that the multi-clock buffer is place and routed.

Figure 2:
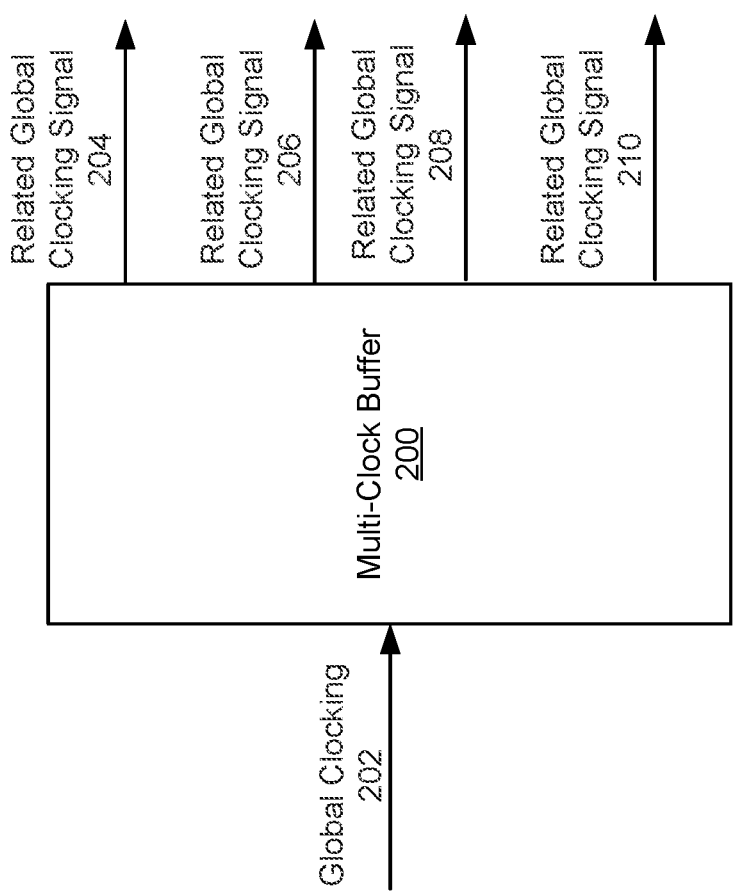
FIG. 2 shows a block diagram depicting a logical view of a multi-clock buffer for generating related clocks, according to some examples.

FIG. 2 shows a block diagram depicting a logical view of a multi-clock buffer for generating related clocks, according to some examples. The multi-clock buffer 200 receives a global clock 202 generated by a clock source. For example, the multi-clock buffer 200 may generate a plurality of outputs 204, 206, 208, and 210 from the received global clocking signal 202. The output signals 204-210 are related to the global clocking 202 signal. For example, the related global clocking signal 204 may be a clock divided by 2, the related global clocking signal 206 may be a clock divided by 4, the related global clocking signal 208 may be a clock divided by 8, and the related global clocking signal 210 may be a clock doubler by 2. It is appreciated that the actual division or multiplication values are given for illustrative purposes and not intended to limit the scope of the embodiments. It is appreciated that the related clocking signals are integer division or multiplication of the global clocking 202 signal. According to some nonlimiting examples, the multi-clock buffer 200 is used to generate a number of related global clocking signals. However, only one of the generated signals is output, e.g., least divided clock by the loads. As such, in a nonlimiting example that four output signals are generated but only one is routed, the multi-clock buffer 200 routes up to four logical clock nets on a single physical clock net, thereby saving power in comparison to the conventional systems by reducing the number of clock buffers that were previously needed to generate the related clocking signals.

Figure 3A:
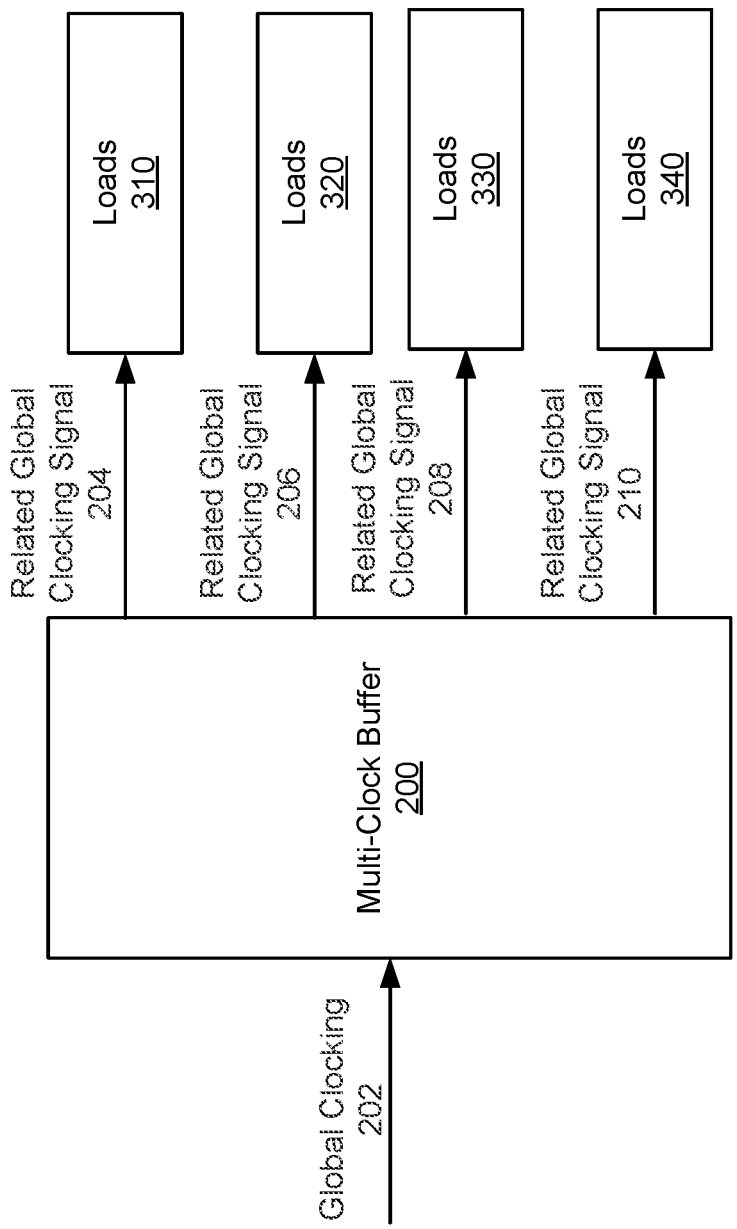
FIGS. 3A-3C show a block diagram depicting a logical view and physical view of a multi-clock buffer, according to some examples.
Figure 3B:
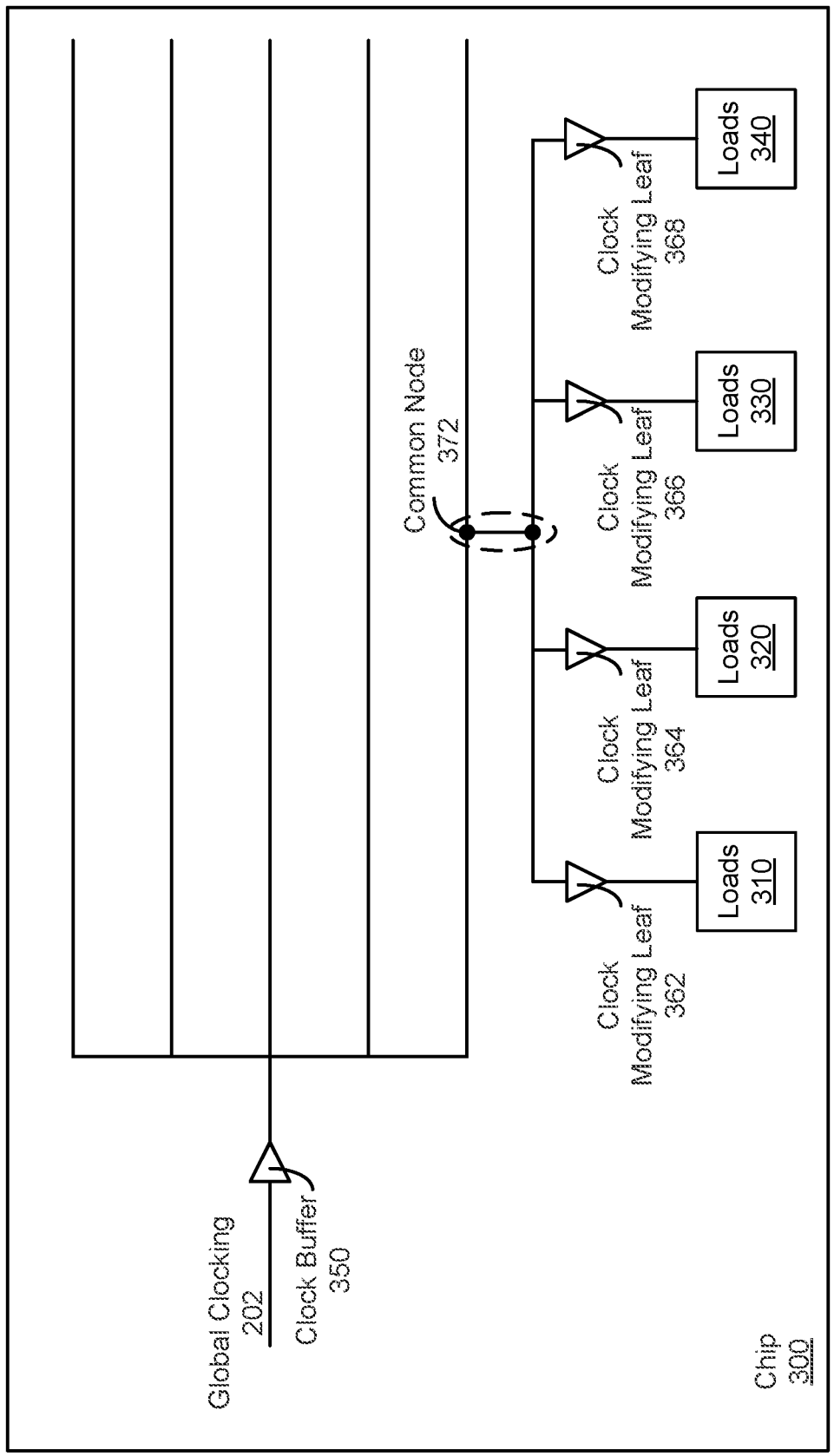
Figure 3C:
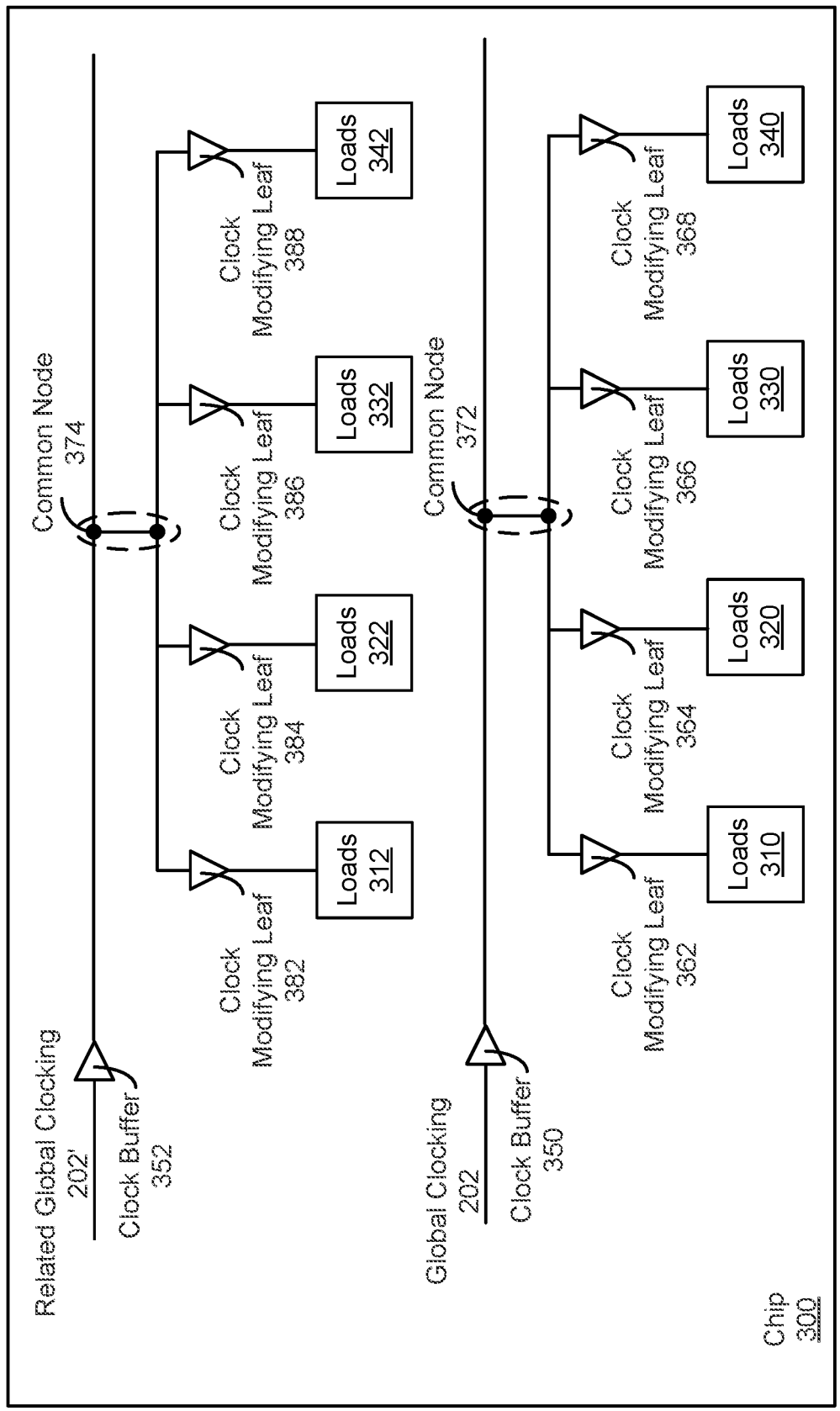

FIGS. 3A-3C show a block diagram depicting a logical view and physical view of a multi-clock buffer, according to some examples. FIG. 3A is substantially similar to that of FIG. 2 except that each related global clocking signal is connected to its respective loads. For example, the related global clocking signal 204 is sent to loads 310, the related global clocking signal 206 is sent to loads 320, the related global clocking signal 208 is sent to loads 330, and the related global clocking signal 210 is sent to loads 340.

Referring now to FIG. 3B, a physical view of FIG. 3A is shown. The global clocking 202 signal generated by a clock source is sent to a clock buffer 350. It is appreciated that the clock buffer 350 may alternatively receive a related clocking signal (not shown). For example, the clock buffer 350 may receive the global clocking 202 divided by 2. The clock buffer 350 fans out the received clocking signal throughout the chip 300 and further to the common node 372. It is appreciated that the common node 372 is a node common to loads 310, 320, 330, and 340. As such, any signal transmission to the common node 372 goes through the same PVT variation, thereby reducing clock skew and clock path pessimism.

It is appreciated that loads 310 may need a first related clocking signal, e.g., global clocking signal divided by 2. It is further appreciated that the loads 320 may need a second related clocking signal, e.g., global clocking signal divided by 4. It is further appreciated that the loads 330 may need a third related clocking signal, e.g., global clocking signal divided by 8. Moreover, it is appreciated that the loads 340 may need a fourth related clocking signal, e.g., global clocking signal divided by 1. During placing and routing stage, the clock buffer 350 is placed, the common node 372 is identified. It is appreciated that the common node 372 may be the nearest common node for the loads 310, 320, 330, and 340. In other words, the common node 372 is identified to be the common node to the loads within the same single physical clock net.

During placing and routing the clock modifying leaf 362, 364, 366, and 368 are placed after the common node 372. The clock modifying leaves may be clock dividers and/or clock doublers. The value associated with each clock modifying leaf is then determined and set. For example, since loads 310 are to receive the global clocking divided by 2 and since the global clocking 202 is being fanned out, the value of the clock modifying leaf 362 is ½. Similarly, the values associated with other clock modifying leaves are determined. For example, the value for the clock modifying leaf 364 is determined to be ¼ for global signal divided by 4, the value for the clock modifying leaf 366 is determined to be ⅛, and the value for the clock modifying leaf 368 is 1. It is appreciated that if the related clocking signal being fanned out was the global signal divided by 2, then the value for the clock modifying leaves 362-368 would respectively be 1, ½, ¼, and a doubler or 2.

Referring now to FIG. 3C, a physical view of FIG. 3A is shown with two multi-clock buffers where each is in a different physical net. In this nonlimiting example, a second multi-clock buffer is used. A related global clocking 202' is received by the clock buffer 352. The related global clocking 202' may be the global clocking 202 divided by 2, as an example. The related global clocking 202' is fanned out to the common node 374 using the clock buffer 352. It is appreciated that the common node 374 is a node common to loads 312, 322, 332, and 342. As such, any signal transmission to the common node 374 goes through the same PVT variation, thereby reducing clock skew and clock path pessimism.

It is appreciated that loads 312 may need a first related clocking signal, e.g., global clocking signal divided by 2. It is further appreciated that the loads 322 may need a second related clocking signal, e.g., global clocking signal divided by 4. It is further appreciated that the loads 332 may need a third related clocking signal, e.g., global clocking signal divided by 8. Moreover, it is appreciated that the loads 342 may need a fourth related clocking signal, e.g., global clocking signal divided by 1. During placing and routing stage, the clock buffer 352 is placed, the common node 374 is identified. It is appreciated that the common node 374 may be the nearest common node for the loads 312, 322, 332, and 342. In other words, the common node 374 is identified to be the common node to the loads within the same single physical clock net.

During placing and routing the clock modifying leaf 382, 384, 386, and 388 are placed after the common node 374. The clock modifying leaves may be clock dividers and/or clock doublers. The value associated with each clock modifying leaf is then determined. For example, since loads 312 are to receive the global clocking divided by 2 and since the related global clocking 202' is being fanned out, the value of the clock modifying leaf 382 is 1. Similarly, the values associated with other clock modifying leaves are determined to be ½, ¼, and a doubler or 2.

It is further appreciated that in some nonlimiting examples a common node for the loads 310, 312, 320, 322, 330, 332, 340, and 342 may be identified and a least divided clocking signal may be fanned out to the respective clock modifying leaves associated with the loads. Under such scenario, the determined value for the clock modifying leaves may be different from the one described above.

It is appreciated that the top path corresponding multi-clock buffer and the bottom path multi-clock buffer are in different physical nets. As such, the clock modifying leaves of the top multi-clock buffer are different from the clock modifying leaves of the bottom multi-clock buffer. Moreover, it is appreciated that the clock modifying leaves of different physical nets do not overlap.

It is appreciated that the output of the multi-clock buffer (physical view) may be marked as a parent net for the loads being driven by it. For example, the output for the related global clocking signal 206 may be marked as the parent net for loads 310, 320, 330, and 340, if the related global clocking signal 206 is being driven to the common node. In some embodiments, the related global clocking signal being driven to the loads may be the least divided clocking signal.

It is appreciated that to synchronize the clock modifying leaves, a clear signal may be asynchronously asserted and synchronously deasserted. It is appreciated that the clock modifying leaves should initially be synchronized otherwise the clock divider might toggle at different cycles relative to one another. An asynchronous global reset signal is transmitted to all clock modifying leaves throughout the chip. After a number of cycles, e.g., long enough to ensure that all clock dividers have received the reset signal, asynchronous global reset is deasserted. The clocks are synchronously enabled. Accordingly, all clock modifying leaves are now synchronized and toggle at the same cycle with respect to one another.

It is appreciated that because the clock modifying leaves are not physically present in the netlist, the router will route the signal driving the clear signal of the multi-clock buffer to every clock modifying leaf after the clock modifying leaf assignment is made. As such, if the clock modifying leaf is moved to a different site the signal is trimmed from the old site and routed to the new site.

It is appreciated that in some embodiments, the user may be provided the option to select the multi-clock buffer through the clocking wizard when multiple clock buffers are connected to the same source generating the global clock or related clock thereto and when multiple clock buffers can be replaced with a single multi-clock buffer. According to one example, an API may be provided to support the placer and router tools such that any net that is part of the multi-clock buffer group (e.g., parent/child relationship) can find other nets in the group. As such, net traversal code can find each load on a net to be used to get all the loads for the network.

In some embodiments, the placer handles the multi-clock buffer in three different phases. During I/O clock source placement phase, all I/O and the clock source resources are placed. The placement occurs according to architectural rules with respect to I/O clock drivers and other clocking resources interacting with these buffers. During clock legalization, the placer satisfies architectural requirement with respect to the number of global clocks that can exist in each clock region and the manner of which the global clocks can be routed from their respective sources to the loads. The placer considers all logical nets of the multi-clock buffers as one net and represented as a "parent net". Resource allocation and assignments are tracked based on the one net. Clock loads for these logical nets may be aggregated as loads of the "parent net" and clock region partitioning use the parent net and its loads. During half column clock legalization, the architectural constraints regarding the number of global clocks that can drive into a half column spine within a clock region are routed are checked.

It is appreciated that in some embodiments, logical nets driven by the same multi-clock buffer are fused into a physical net. For example, loads 310, 320, 330, and 340 are fused into a single physical net. Moreover, it is appreciated that the router may store mapping from each load of the combined physical net to its original logical net. Accordingly, during global clock routing phase, router considers these nets as regular global clock nets and they are routed and legalized with other global clocks.

It is appreciated that loads from different nets are assigned to different clock modifying leaves. Moreover, paths from the clock modifying leaf to load pins of different nets are non-overlapping. It is further appreciated that different clock modifying leaves are assigned to different loads of multi-clock buffer nets such that a set of loads with a same related clocking signal, e.g., divide by 4, get a unique clock modifying leaf assigned thereto. The router may deposit the appropriate clock modifying leaf value to the physical database to be used during bitstream generation.

FIG. 4 shows a block diagram depicting a physical view of a multi-clock buffer and a set of common nodes, according to some examples. FIG. 4 is substantially similar to that of FIG. 3B except that more than one common node may be identified. For example, common nodes 392 may be identified in addition to the common node 372. The common node 372 is identified as the closest in proximity to the loads 310, 320, 330, and 340. The closer the common node is to the loads the less distance the signal travels from the common node to the loads, thereby reducing clock pessimism and clock skew. In other words, the point of divergence for the loads are pushed further out and as close to the loads as possible such that the signal being transmitted is subject to the same PVT and conditions as long as possible before having to separate. It is appreciated that identification of the common node 372 as the closest in proximity to the loads is for illustrative purposes and should not be construed as limiting the scope of the embodiments. For example, any of the other common nodes may be identified and used after placing and routing the loads. In other words, identifying the common node may be dependent on placement of the loads. For example, in some embodiments the loads that are clustered together (physically) may have a common node that is closer in proximity to the loads, while in other embodiments where some loads are positioned in one corner of the chip (e.g., top left corner) and other loads are positioned in the opposite corner of the chip (e.g., bottom right corner) the common node is identified as somewhere in between (e.g., middle of the chip somewhere). Accordingly, the identification of the common node is dependent on placement and routing of the loads.

Figure 5A:
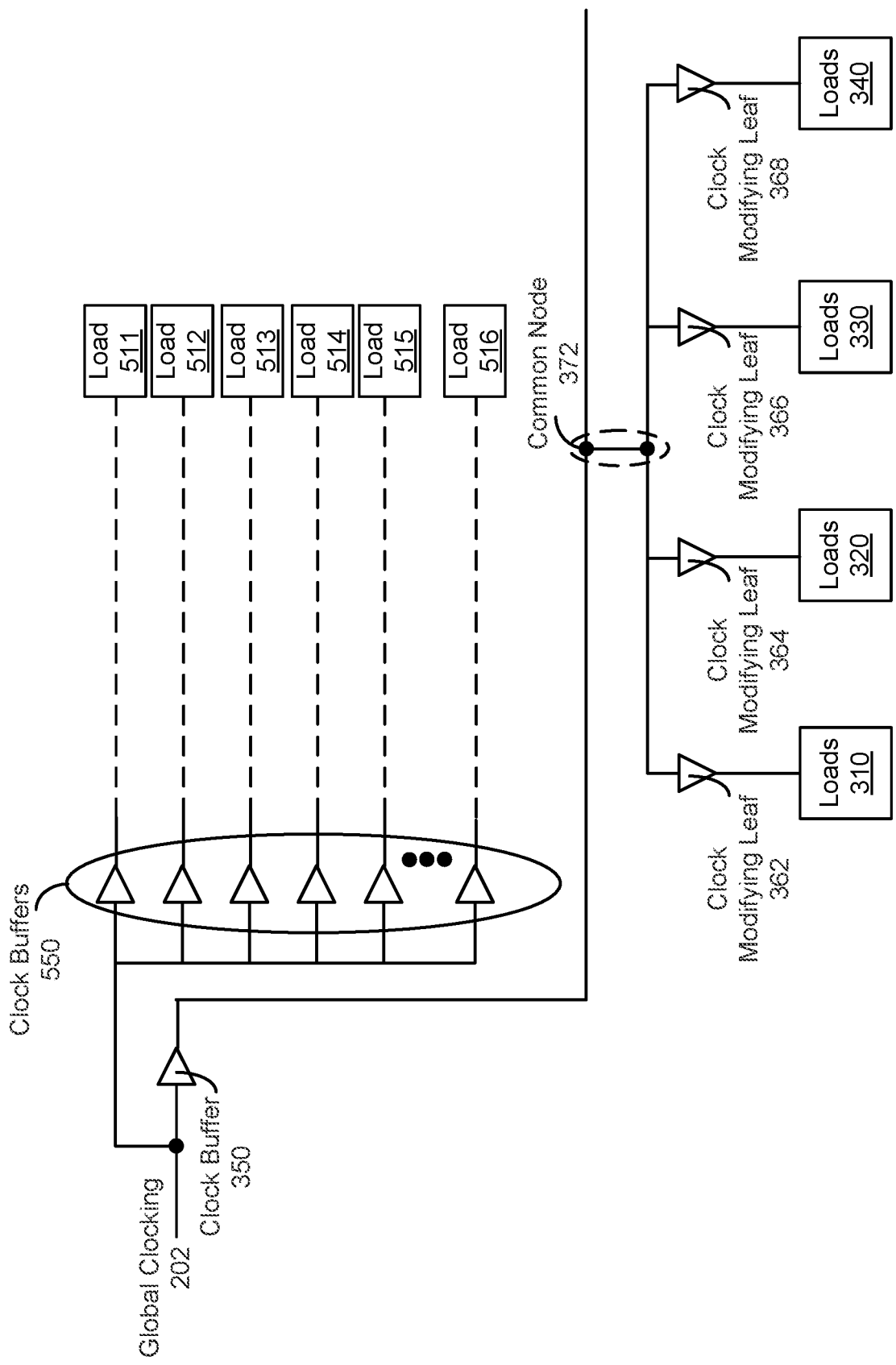

FIGS. 5A-5B show optimization in replacing multiple clock buffers with a lower number of multi-clock buffers instead to reduce clock pessimism, according to some examples. FIG. 5A is substantially similar to that of FIG. 3B except that additional clock buffers 550 drive respective loads 511-516. Clock buffers 550 may receive the global clocking 202 signal or a related clocking signal. The clock buffers 550 send their received signal to their respective loads 511-516. In other words, the clock buffers 550 include parallel clock buffers that clock different loads with the same clocking signal. In some nonlimiting examples, a subset of the clock buffers 550 may have a common driver or may be parallel and connected to a block generating the clocking signal or related signal thereto. As such, a subset of the clock buffers 550 may be replaced with a single multi-clock buffer. It is appreciated that before replacing the clock drivers 550 or a subset thereof with a multi-clock buffer, the common control signals and timing constraints on the clock buffers 550 are checked to allow for similar functionality when replaced with a multi-clock buffer. For example, for parallel clock buffers connected to the same clock output the setting for the clock output driving the clock buffers match to ensure equivalent functionality when multi-clock buffer is used.

Referring now to FIG. 5B, replacing a subset of the clock buffers 550 with a multi-clock buffer is show. For example, every clock buffer within the clock buffers 550 is removed except for the clock buffer 552. Other clock buffers that are removed have a similar clock fanout as the one being fanned out by the clock buffer 350. The loads 512-516 are removed and placed with loads 310 and 330, in this example, forming loads 310' and 330'. In other words, the loads 512-516 that receive a similar related clocking signal as that of loads 310 may be formed together to form loads 310' and loads 512-516 that receive a similar related clocking signal as that of loads 330 may be formed together to form loads 330'. As such, the number of clock buffers are reduced, the number of related clocking signals being fanned out is reduced, power is saved, and metal usage is reduced while clock pessimism, clock skew, and signal jitter is improved.

It is therefore appreciated that when clocks come from different clock outputs of the same clock modifier block (i.e. generating the related global clock), one clock output may be selected and all clock buffers may be merged into a single multi-clock buffer. It is appreciated that this process may continue until no more clock buffers can be replaced with a multi-clock buffer.

Figure 6A:
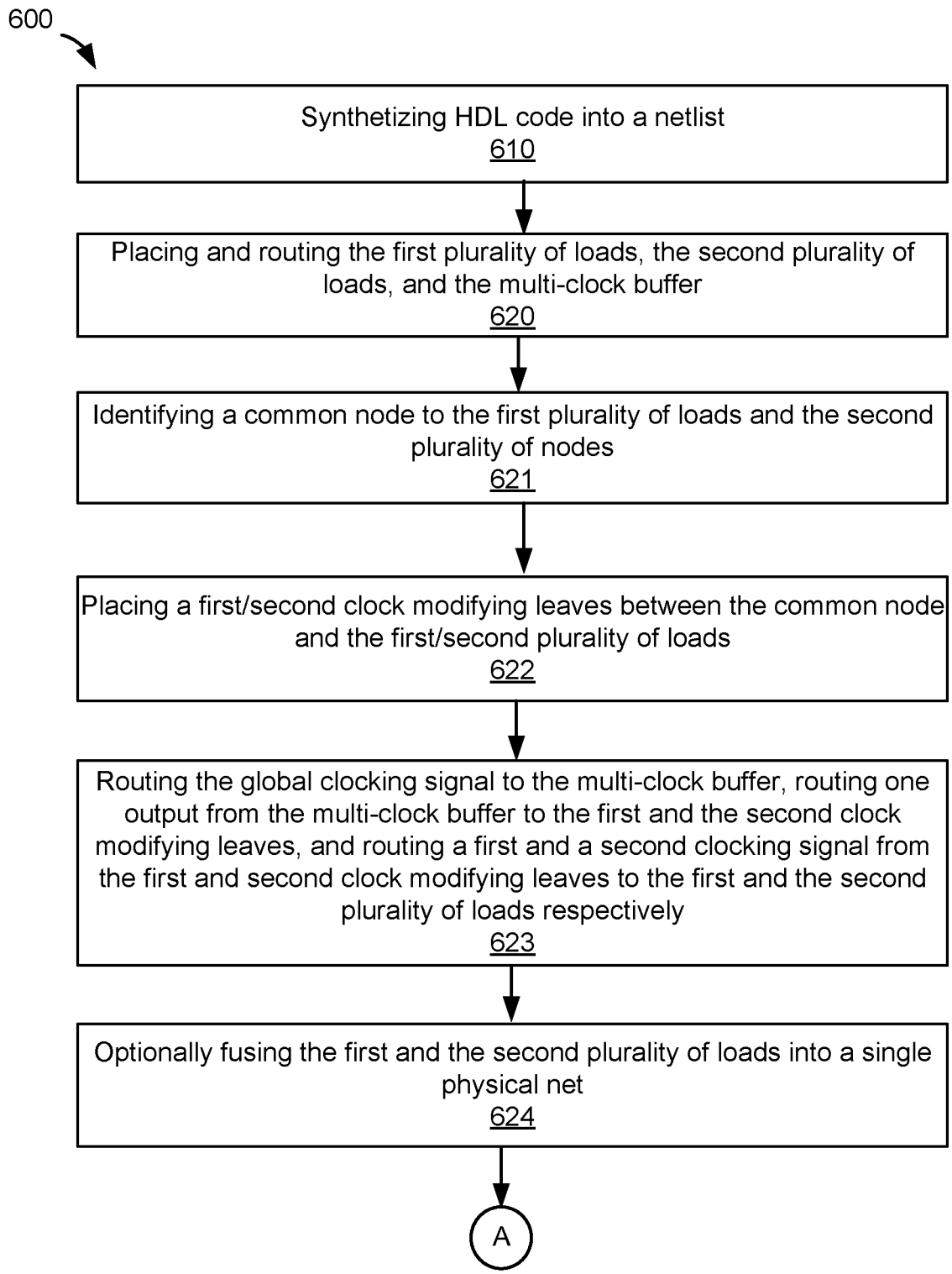
FIGS. 6A-6C show a method flow for synthetizing, placing, and routing to leverage use of multi-clock buffers to reduce clock pessimism, according to some examples.
Figure 6B:
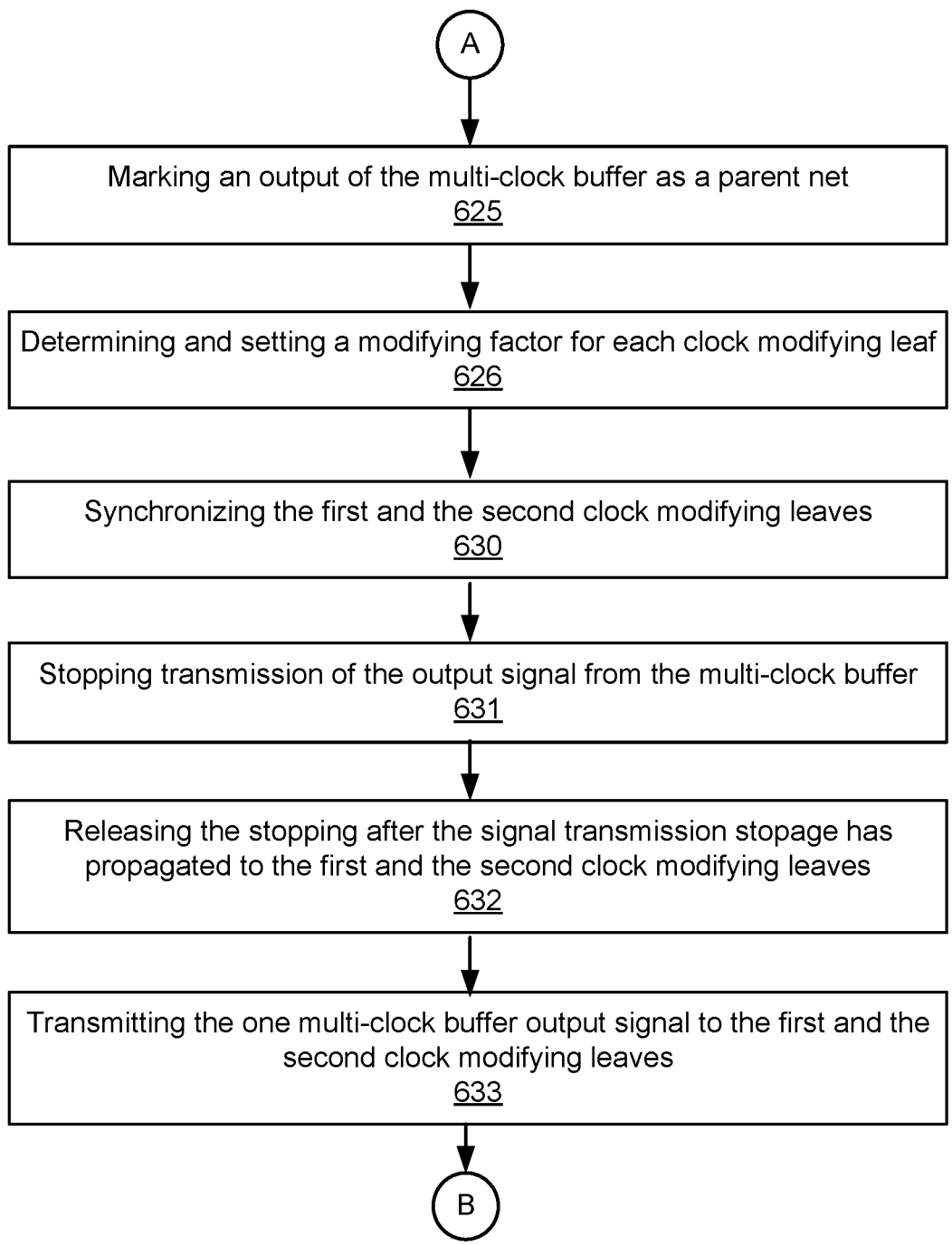
Figure 6C:
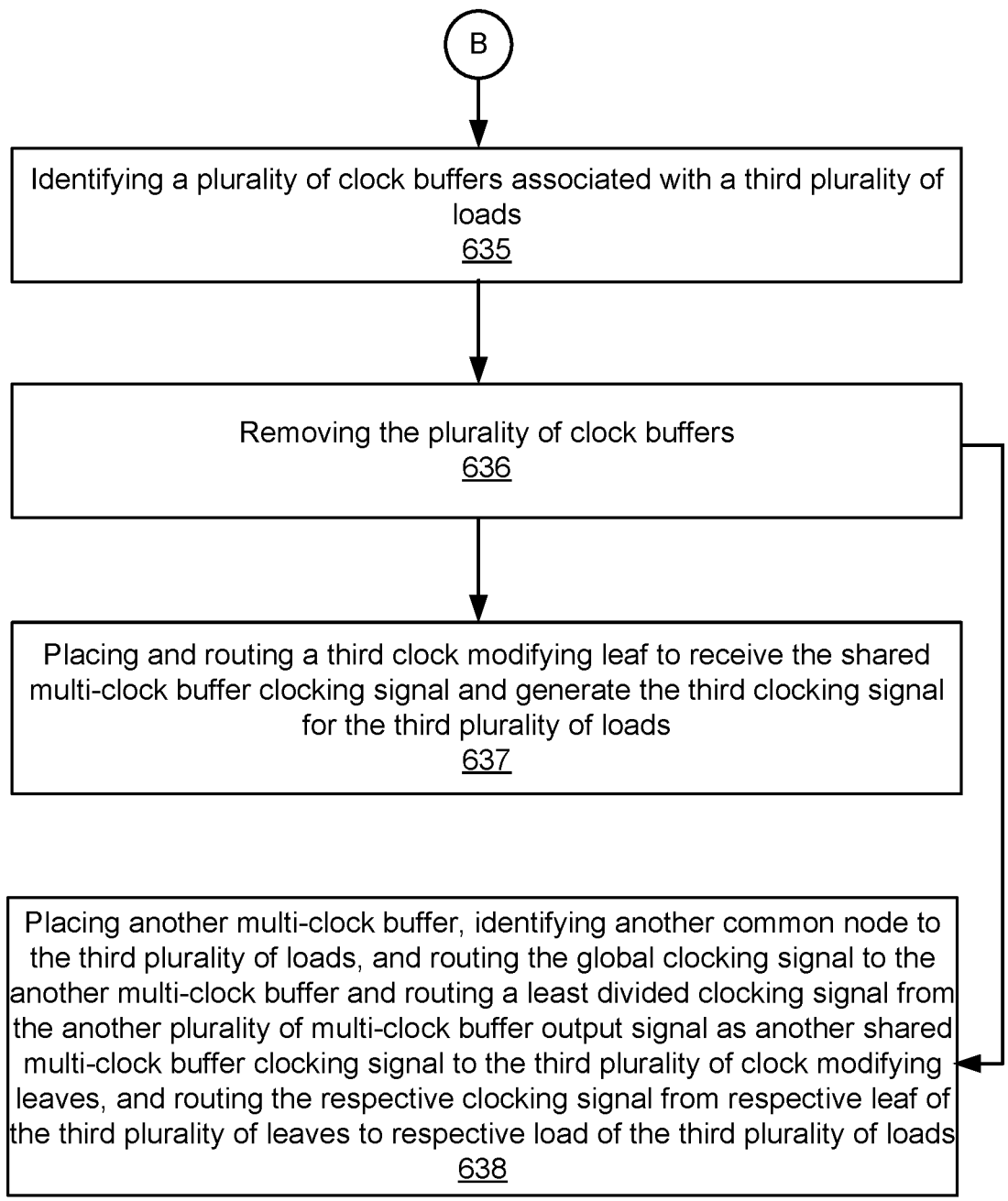

FIGS. 6A-6C show a method flow for synthetizing, placing, and routing to leverage use of multi-clock buffers to reduce clock pessimism, according to some examples. At step 610, an HDL code is synthesized into a netlist, as described above with respect to FIGS. 1-5B. The netlist may include a first plurality of loads, a second plurality loads, and a multi-clock buffer. At step 620, the first plurality of loads, the second plurality of loads, and the multi-clock buffer are placed and routed, as described above with respect to FIGS. 1-5B. The multi-clock buffer may receive a global clocking signal and it may generate a plurality of multi-clock buffer output signals related to the global clocking signal. The first plurality of loads is configured to receive a first clocking signal and the second plurality of loads is configured to receive a second clocking signal. It is appreciated that step 620 may further include identifying a common node to the first plurality of loads and the second plurality of loads, at step 621 and as described in FIGS. 1-5B. The common node may be identified to reduce a clocking pessimism analysis during timing analysis to within a predetermined threshold value. The common node is positioned closer in proximity to the first plurality of loads and the second plurality of loads in comparison to a clock source generating the global clocking signal. It is appreciated that a plurality of common nodes may be identified and that the used the common node may be based on its proximity, e.g., a closest common node to the first plurality of loads and the second plurality of loads that can share the one multi-clock buffer output signal before locally generating the first and the second clocking signals using the first and the second clock modifying leaves respectively.

At step 622, a first and a second clock modifying leaves that are configured to generate the first and the second clocking signals respectively are placed between the common node and the first and the second plurality of loads, as described in FIGS. 1-5B. It is appreciated that the first plurality of loads may be assigned to the first clocking signal to be driven by the first clocking signal. Similarly, the second plurality of loads may be assigned to the second clocking signal to be driven by the second clocking signal.

At step 623 the global clocking signal is routed to the multi-clock buffer, one multi-clock buffer output signal is routed from the plurality of multi-clock buffer output signals as a shared multi-clock buffer clocking signal to the first and second clock modifying leaves, and the first clocking signal is routed from the first clock modifying leaf to the first plurality of loads and the second clocking signal is routed from the second clock modifying leaf to the second clock modifying leaf, as described above with respect to FIG. 1.

Optionally at step 624, the first plurality of loads and the second plurality of loads are fused into a single physical net driven by the multi-clock buffer, as described above. A third plurality of loads driven by a buffer different from the multi-clock buffer is in a different physical net, as described above. It is appreciated that the different physical net for the third plurality of loads is driven by different clock modifying leaves than the single physical net. It is further appreciated that paths from the different clock modifying leaves to the third plurality of loads are nonoverlapping with paths from the single physical net.

At step 625, an output of the multi-clock buffer corresponding to the one multi-clock buffer output signal may be marked as a parent net for the first plurality of loads and the second plurality of loads, as described above with respect to FIGS. 1-5B. It is appreciated that the one multi-clock buffer output signal may be a least divided clocking signal. At step 626, modifying factor associated with the first clock modifying leaf and the second clock modifying leaf are determined and set based on the least divided clocking signal, as described above. It is appreciated that the one multi-clock buffer output signal may be the same as the first clocking signal. It is further appreciated that the plurality of multi-clock buffer output signals is an integer division of the global clocking signal.

At step 630, the first and the second clock modifying leaves are synchronized, as described above with respect to FIGS. 1-5B. For example, at step 631, transmission of the one multi-clock buffer output signal to the first and the second clock modifying leaves is stopped. At step 632, the stopping is released after the multi-clock buffer output signal transmission stoppage has propagated to the first and the second clock modifying leaves. At step 633, the one multi-clock buffer output signal is transmitted to the first and the second clock modifying leaves.

At step 635, a plurality of clock buffers associated with a third plurality of loads may be identified, as described above with respect to FIGS. 5A-5B. Each of the identified clock buffers of the plurality of clock buffers is configured to receive the global clocking signal and to generate a third clocking signal that is related to the global clocking signal. Moreover, the third clocking signal is an input to each load of the third plurality of loads and the third clocking signal has a same waveform as an output signal of the plurality of multi-clock buffer output signals. Accordingly, at step 636, the plurality of clock buffers as identified are removed and at step 637, a third clock modifying leaf that is configured to receive the shared multi-clock buffer clocking signal from the multi-clock buffer and to generate the third clocking signal is placed and routed. The third clock modifying leaf is placed between the common node and the third plurality of loads and routes the third clocking signal to the third plurality of loads.

In some embodiments, optionally at step 638, another multi-clock buffer configured to receive the global clocking signal and generate the another plurality of multi-clock buffer output signals is placed. Moreover, at step 638, another common node to the third plurality of loads is selected. The another common node is identified to reduce a clocking pessimism analysis during timing analysis to within a predetermined threshold value. It is appreciated that the another common node is positioned closer in proximity to the third plurality of loads in comparison to the clock source generating the global clocking signal. It is appreciated that a plurality of clock modifying leaves configured to generate clocking signals corresponding to the another plurality of clock buffer output signals is placed between the another common node and the third plurality of loads. Moreover, at step 638, the global clocking signal is routed to the another multi-clock buffer and a least divided clocking signal is routed from the another plurality of multi-clock buffer output signal as another shared multi-clock buffer clocking signal to the third plurality of clock modifying leaves. Furthermore, at step 638, the respective clocking signal from respective leaf of the third plurality of leaves are routed to respective load of the third plurality of loads.

Figure 7:
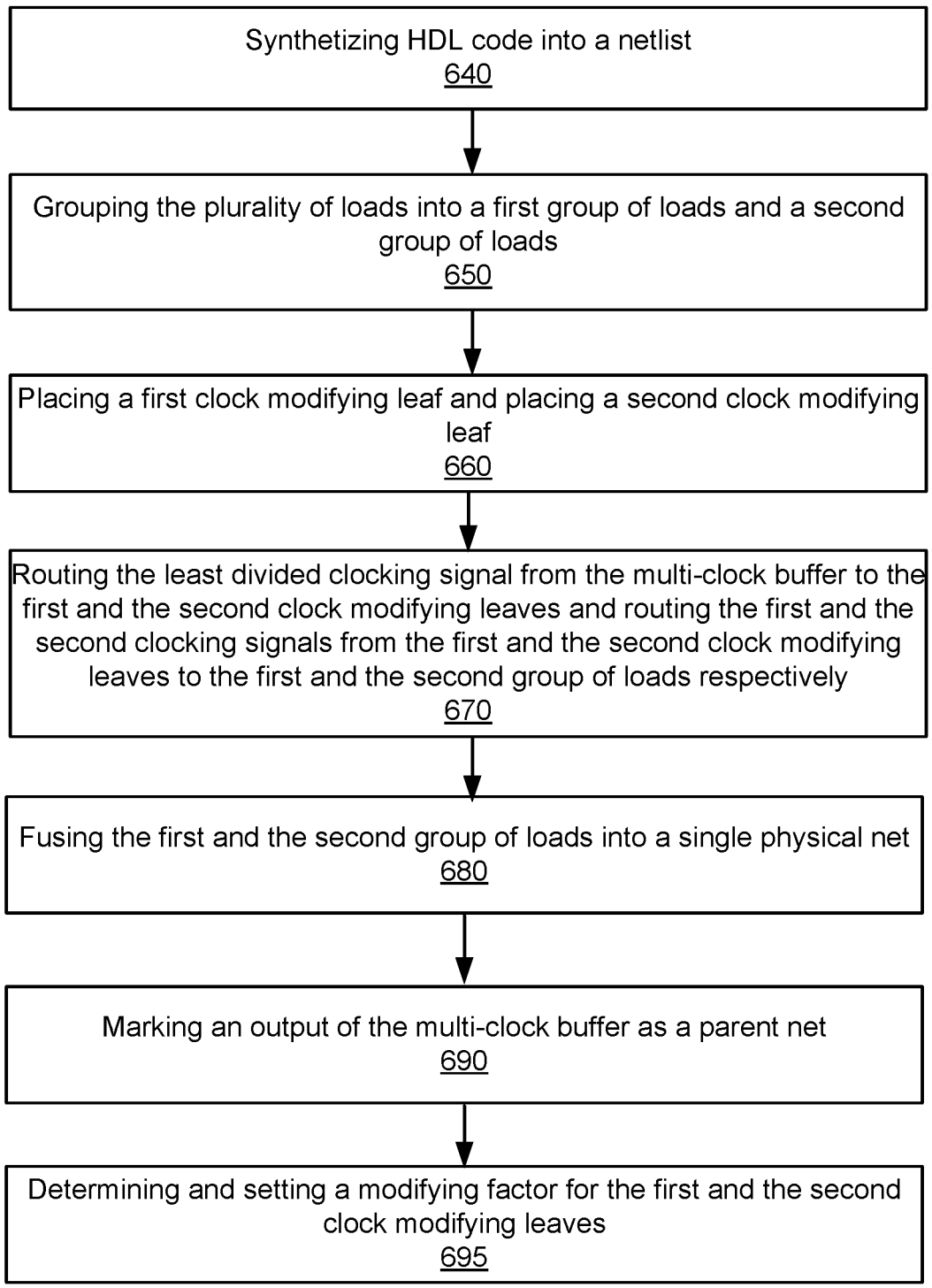
FIG. 7 shows another method flow for synthetizing, placing, and routing to leverage use of multi-clock buffers to reduce clock pessimism, according to some examples.

FIG. 7 shows another method flow for synthetizing, placing, and routing to leverage use of multi-clock buffers to reduce clock pessimism, according to some examples. At step 640, an HDL code is synthesized into a netlist comprising a plurality of loads and a multi-clock buffer, as described above with respect to FIGS. 1-5B. The multi-clock buffer is configured to receive a global clocking signal and to generate a plurality of related clocking signals including a first clocking signal and a second clocking signal. At step 650, the plurality of loads is grouped into a first and a second group of loads. The first group of loads is configured to receive the first clocking signal and the second group of loads is configured to receive the second clocking signal, as described above with respect to FIGS. 1-5B. At step 660, a first clock modifying leaf is placed between a node and the first group of loads. It is appreciated that the node is a common to the first and the second group of loads and is positioned closer in proximity to the first and the second group of loads in comparison to a clock source generating the global clocking signal. It is further appreciated that the first clock modifying leaf is configured to receive a least divided clocking signal from the multi-clock buffer. At step 660, a second clock modifying leaf is placed between the node and the second group of loads. It is appreciated that the second clock modifying leaf is configured to receive the least divided clocking signal from the multi-clock buffer. According to some embodiments, at step 670, the least divided clocking signal is routed from the multi-clock buffer, that receives the global clocking signal and generates the plurality of related clocking signals, to the first and the second clock modifying leaves. Moreover, at step 670, the first clocking signal is routed from the first clock modifying leaf to the first group of loads. It is appreciated that at step 680, the second clocking signal is routed from the second clock modifying leaf to the second group of loads. At step 680, the first group of loads and the second group of loads are fused into a single physical net driven by the multi-clock buffer. It is appreciated that a third group of loads driven by a buffer different from the multi-clock buffer is in a different physical net. It is appreciated that the different physical net for the third group of loads is driven by different clock modifying leaves than the single physical net driving the first and the second group of loads. In some embodiments, at step 690, an output of the multi-clock buffer corresponding to the least divided clocking signal is marked as a parent net for the first group of loads and the second group of nodes. It is appreciated that in some embodiments, at step 695, a modifying factor associated with the first clock modifying leaf and the second clock modifying leaf are determined and set based on the least divided clocking signal, as described in FIGS. 1-5B.

Figure 8:
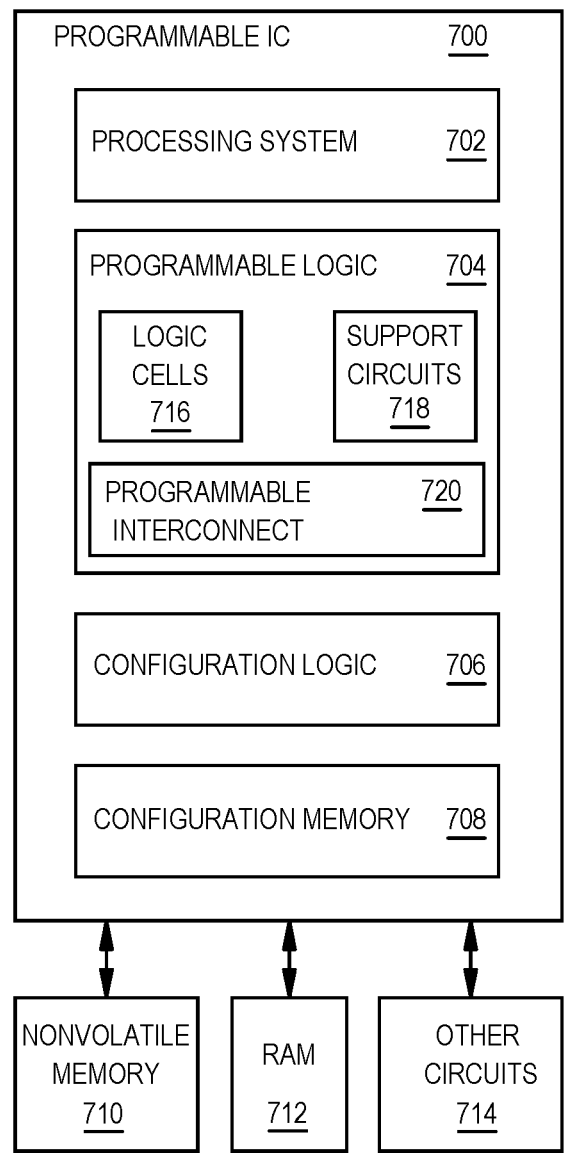
FIG. 8 is a block diagram depicting a programmable integrated circuit (IC), according to some examples.

FIG. 8 is a block diagram depicting a programmable integrated circuit (IC) 700 according to an example. The programmable IC 700 can implement the integrated circuit (IC) chip of systems of FIGS. 1-7, in whole or in part. The programmable IC 700 includes a processing system 702, programmable logic 704, configuration logic 706, and configuration memory 708. The programmable IC 700 can be coupled to external circuits, such as nonvolatile memory 710, RAM 712, and other circuits 714.

In the illustrated example, the processing system 702 can include microprocessor(s), memory, support circuits, IO circuits, and the like. The programmable logic 704 includes logic cells 716, support circuits 718, and programmable interconnect 720. The logic cells 716 include circuits that can be configured to implement general logic functions of a plurality of inputs. The support circuits 718 include dedicated circuits, such as transceivers, input/output blocks, digital signal processors, memories, and the like. The logic cells and the support circuits 718 can be interconnected using the programmable interconnect 720. Information for programming the logic cells 716, for setting parameters of the support circuits 718, and for programming the programmable interconnect 720 is stored in the configuration memory 708 by the configuration logic 706. The configuration logic 706 can obtain the configuration data from the nonvolatile memory 710 or any other source (e.g., the RAM 712 or from the other circuits 714).

Figure 9:
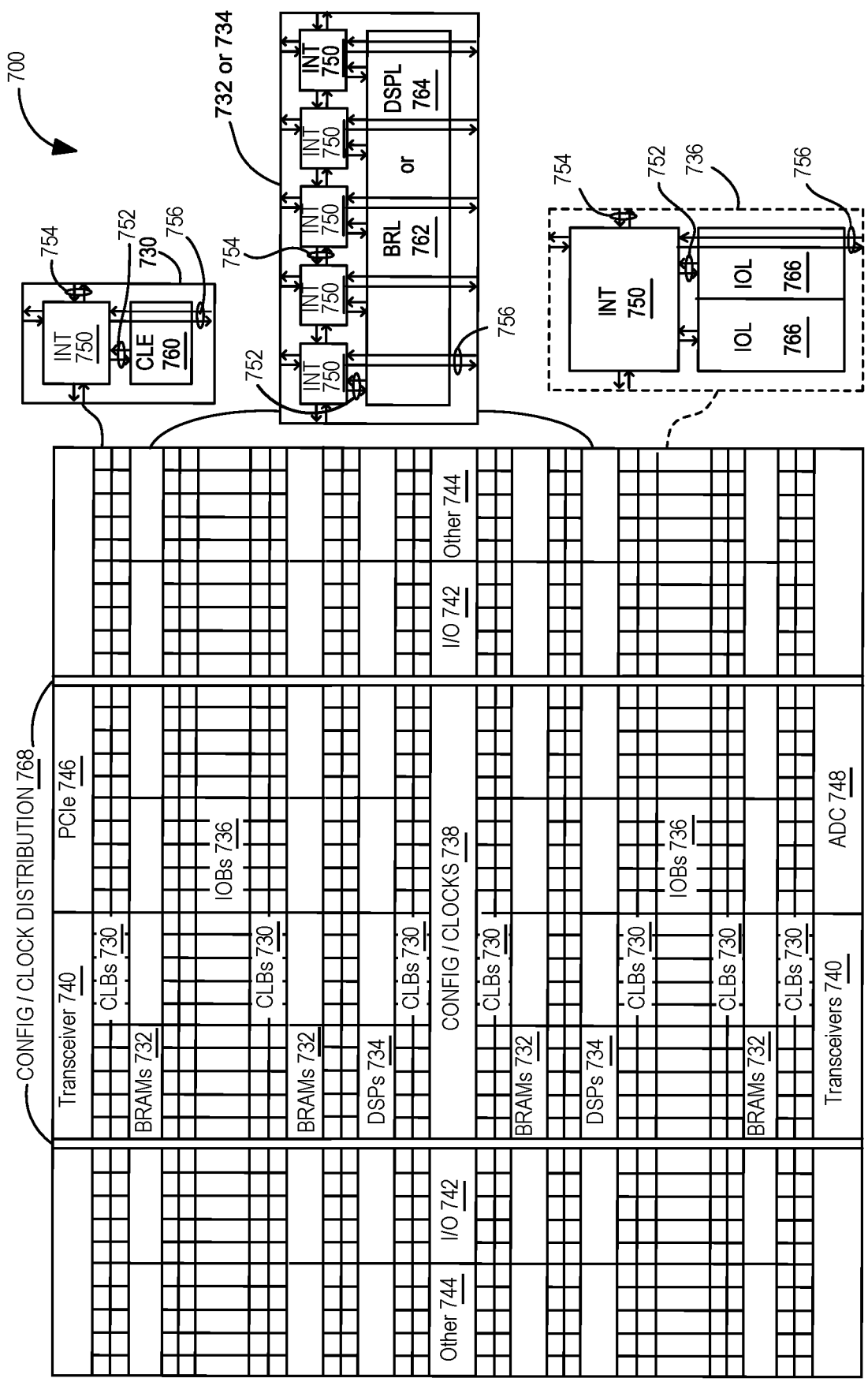
FIG. 9 is a field programmable gate array (FPGA) implementation of the programmable IC, according to some examples.

FIG. 9 illustrates an FPGA implementation of the programmable IC 700 that includes a large number of different programmable tiles including configurable logic blocks ("CLBs") 730, random access memory blocks ("BRAMs") 732, signal processing blocks ("DSPs") 734, input/output blocks ("IOBs") 736, configuration and clocking logic ("CONFIG/CLOCKS") 738, digital transceivers 740, specialized input/output blocks ("I/O") 742 (e.g., configuration ports and clock ports), and other programmable logic 744 such as digital clock managers, system monitoring logic, and so forth. The FPGA can also include PCIe interfaces 746, analog-to-digital converters (ADC) 748, and the like.

In some examples, each programmable tile in an FPGA can include at least one programmable interconnect element ("INT") 750 having connections to input and output terminals 752 of a programmable logic element within the same tile, as shown by examples included in FIG. 9. Each programmable interconnect element 750 can also include connections to interconnect segments 754 of adjacent programmable interconnect element(s) in the same tile or other tile(s). Each programmable interconnect element 750 can also include connections to interconnect segments 756 of general routing resources between logic blocks (not shown). The general routing resources can include routing channels between logic blocks (not shown) comprising tracks of interconnect segments (e.g., interconnect segments 756) and switch blocks (not shown) for connecting interconnect segments. The interconnect segments of the general routing resources (e.g., interconnect segments 756) can span one or more logic blocks. The programmable interconnect elements 750 taken together with the general routing resources implement a programmable interconnect structure ("programmable interconnect") for the illustrated FPGA.

In an example of implementation, a CLB 730 can include a configurable logic element ("CLE") 760 that can be programmed to implement user logic plus a single programmable interconnect element ("INT") 750. A BRAM 732 can include a BRAM logic element ("BRL") 762 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 734 can include a DSP logic element ("DSPL") 764 in addition to an appropriate number of programmable interconnect elements. An IOB 736 can include, for example, two instances of an input/output logic element ("IOL") 766 in addition to one instance of the programmable interconnect element 750. As will be clear to those of skill in the art, the actual I/O pads connected, for example, to the input/output logic element 766 typically are not confined to the area of the input/output logic element 766.

In the pictured example, a horizontal area near the center of the die is used for configuration, clock, and other control logic. Vertical columns 768 extending from this horizontal area or column are used to distribute the clocks and configuration signals across the breadth of the FPGA.

In some examples, FPGAs utilizing the architecture illustrated in FIG. 9 include additional logic blocks that disrupt the regular columnar structure making up a large part of the FPGA. The additional logic blocks can be programmable blocks and/or dedicated logic. Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method, comprising:
   placing and routing components of a netlist, wherein the components include a first plurality of loads configured to receive a first clocking signal and a second plurality of loads configured to receive a second clocking signal, wherein the second clocking signal is an integer multiple or an integer divisor of the first clocking signal, and wherein the placing and routing comprises,
   placing the first plurality of loads, the second plurality of loads, and a first clock buffer,
   selecting one of multiple nodes as a first common node based on physical distances between the first clock buffer and the nodes and distances between the nodes and the first and second plurality of loads,
   placing a first clock modifying leaf circuit between the first common node and the first plurality of loads, wherein the first clock modifying leaf circuit is configured to multiply or divide an input to the first clock modifying leaf circuit by the integer,
   routing a global clocking signal to the first clock buffer,
   routing an output of the first clock buffer to the first common node,
   routing the first common node to the input of the first clock modifying leaf circuit,
   routing an output of the first clock modifying leaf circuit to the first plurality of loads, and
   routing the first common node to the second plurality of loads.

2. The method of claim 1, further comprising fusing the first plurality of loads and the second plurality of loads into a first physical net driven by the first clock buffer, wherein a third plurality of loads driven by a second clock buffer is in a second physical net.

3. The method of claim 2, wherein the second physical net is driven by a second clock modifying leaf circuit.

4. The method of claim 3, wherein paths from the second clock modifying leaf circuit to the third plurality of loads are non-overlapping with paths from the first physical net.

5. The method of claim 1, wherein the selecting comprises selecting one of the multiple nodes as the first common node to minimize distances between the first common node and the first and second plurality of loads relative to a distance between the first clock buffer and the first common node.

6. The method of claim 1, further comprising marking the output of the first clock buffer as a parent net for the first plurality of loads and the second plurality of loads, wherein the output of the first clock buffer is a least divided clocking signal.

7. The method of claim 6, further comprising determining and setting a modifying factor associated with the first clock modifying leaf circuit based on the least divided clocking signal.

8. The method of claim 1, further comprising placing a second clock modifying leaf circuit between the first common node and the second plurality of loads, wherein:
the routing the first common node to the second plurality of loads comprises routing the first common node to an input of the second clock modifying leaf circuit and routing an output of the second clock modifying leaf circuit to the second plurality of loads; and
the method further comprises synchronizing the first and the second clock modifying leaf circuits.

9. The method of claim 8, wherein the synchronizing comprises:
stopping transmission of the output of the first clock buffer to the first and the second clock modifying leaf circuits;
releasing the stopping after the stoppage of the output of the first clock buffer has propagated to the first and the second clock modifying leaf circuits; and
transmitting the output of the first clock buffer to the first and the second clock modifying leaf circuits subsequent to the releasing.

10. The method of claim 1 further comprising assigning a set of loads to be driven by the first clocking signal to the first plurality of loads.

11. The method of claim 1, further comprising:
identifying a plurality of clock buffers associated with a third plurality of loads, wherein each clock buffer of the plurality of clock buffers is configured to receive the global clocking signal and to generate a third clocking signal that is related to the global clocking signal to a respective load of the third plurality of loads;
removing the plurality of clock buffers;
placing second clock modifying leaf circuit between the first common node and the third plurality of loads;
routing the first common node to second clock modifying leaf circuit; and
routing an output of the second clock modifying leaf circuit to the third plurality of loads.

12. The method of claim 1 further comprising:
identifying a plurality of clock buffers associated with a third plurality of loads, wherein each clock buffer of the plurality of clock buffers is configured to receive the global clocking signal and to generate a third clocking signal related to the global clocking signal;
removing the plurality of clock buffers;
placing a second clock buffer configured to receive the global clocking signal;
identifying selecting another one of the multiple nodes as a second common node based on physical distances between the second clock buffer and the nodes and distances between the nodes and the third plurality of loads; and
routing the global clocking signal to the second clock buffer;
routing an output of the second clock buffer to the second common node; and
routing the second common node to the third plurality of loads.

13. The method of claim 1 wherein a load of the first plurality of loads includes a flip-flop and/or a configurable logic block.

14. An apparatus, comprising:
processor circuitry configured to,
place components of a netlist, wherein the netlist includes first and second loads and a first clock buffer, wherein the first and second loads are configured to receive respective first and second clocking signals, and wherein the second clocking signal is an integer multiple or an integer divisor of the first clocking signal;
select one of multiple nodes as a common node based on physical distances between the first clock buffer and the nodes and distances between the nodes and the first and second loads,
place a first clock modifying leaf circuit between the common node and the first load, wherein the first clock modifying leaf circuit is configured to multiply or divide an input to the first clock modifying leaf circuit by the integer,
route a global clocking signal to the first clock buffer,
route an output of the first clock buffer to the common node,
route the common node to the input of the first clock modifying leaf circuit,
route an output of the first clock modifying leaf circuit to the first load, and
route the common node to the second load.

15. The apparatus of claim 14, wherein the processor circuitry is further configured to:
select the common node to minimize distances between the common node and the first and second loads relative to a distance between the first clock buffer and the common node.

16. The apparatus of claim 14, wherein the processor circuitry is further configured to:
place a second clock modifying leaf circuit between the common node and the second load;
route the common node to the second load by routing the common node to an input of the second clock modifying leaf circuit and routing an output of the second clock modifying leaf circuit to the second load; and
synchronize the first and the second clock modifying leaf circuits.

17. The apparatus of claim 14, wherein the processor circuitry is further configured to:
identify a plurality of clock buffers associated with a third plurality of loads, wherein each clock buffer of the plurality of clock buffers is configured to receive the global clocking signal and to provide a third clocking signal that is related to the global clocking signal to a respective load of the third plurality of loads;
remove the plurality of clock buffers;
place a third clock modifying leaf circuit between the common node and the third plurality of loads;
route the common node to an input of the third clock modifying leaf circuit; and
route an output of the third clock modifying leaf circuit to the third plurality of loads.

* * * * *